United States Patent

[11] 3,600,074

[72] Inventor Yasuo Ueno
 Ohmiya-shi, Japan
[21] Appl. No. 856,074
[22] Filed Sept. 8, 1969
[45] Patented Aug. 17, 1971
[73] Assignee Fuji Shashin Koki Kabushiki Kaisha
 Ohmiya-shi, Japan

[54] FILM FEEDING DEVICE IN MOTION-PICTURE PROJECTORS
 2 Claims, 3 Drawing Figs.
[52] U.S. Cl.................................................. 352/194,
 352/169
[51] Int. Cl. .................................................. G03b 1/22
[50] Field of Search........................................ 352/194,
 169, 180, 173; 226/65

[56] References Cited
 UNITED STATES PATENTS
| | | | | |
|---|---|---|---|---|
| 2,173,230 | 9/1939 | Kellogg.................... | 352/194 X |
| 3,152,741 | 10/1964 | Jorgensen................. | 352/194 X |
| 3,261,654 | 7/1966 | Faber et al................. | 352/194 |
| 3,402,007 | 9/1968 | Gerlach..................... | 352/194 X |
| 3,471,227 | 10/1969 | McClellan et al......... | 352/173 X |
| 3,489,493 | 1/1970 | Aoki........................... | 352/180 |
| 3,502,403 | 3/1970 | Riedel........................ | 352/194 |

Primary Examiner—Louis R. Prince
Assistant Examiner—Joseph W. Roskos
Attorney—Waters, Roditi, Schwartz and Nissen ABSTRACT: A claw member having a claw for feeding a film by engagement with the film perforation is pivotally connected to the frame of a projector. A cam is fixedly mounted on a power-driven main shaft for causing a film feeding motion of the claw member, whereas a disc cam is rotatably mounted on the main shaft for bringing the claw into or out of engagement with the film perforation. The phase relation between the cam and the cam disc can be selected by selectively engaging a pin on a gear which is rotatably and axially slidably mounted on a main shaft and driven from said main shaft through a reduction gearing, with one of pins mounted on the disc cam, whereby the speed of the film is changed stepwise without changing the speed of a sector.

PATENTED AUG 17 1971

3,600,074

FILM FEEDING DEVICE IN MOTION-PICTURE PROJECTORS

BACKGROUND OF THE INVENTION

The present invention relates to a film feeding device of motion-picture projector, and more particularly to such a film feeding device which is capable of changing the speed of the film.

With a conventional film feeding device of the type described, the speed of a film is generally changed by a variable-speed electric motor. In such a conventional device, however, since the rotational speed of a sector is also reduced incident to lowering of the film speed, flicker occurs on the screen when the film speed is reduced, for example, to one third of the standard speed, and thus the picture image on the screen is completely spoiled.

SUMMARY OF THE INVENTION

The present invention primarily aims to obviate the above-described defect of the conventional film feeding device.

In more detail, it is an object of the present invention to provide a film feeding device which is so constructed that the film speed can be changed stepwise, without changing the rotational speed of a sector.

According to the present invention, there is provided a film feeding device in a motion-picture projector, which comprises a claw means having a claw adapted for engagement with the perforation of a film, first cam means for imparting a film feeding motion to said claw means, second cam means for bringing the claw of said claw means into or out of engagement with the film perforation, means for rotating said first cam means at a predetermined rate and means for placing said second cam means in a selected phase relation with respect to said first cam means and rotating said second cam means in said selected phase relation at a selected speed reduction ratio relative to said first cam means, said second cam means being of such shape that the frequency of the film feeding motion of said claw means overlapping the engagement of said claw with the film perforation can be varied in accordance with the phase relation of said second cam means to said first cam means.

In order that the features of the present invention may be fully understood, a preferred embodiment of the invention will be described hereunder with reference to the accompanying drawings.

DESCRIPTION OF THE PREFERRED EMBODIMENT

Figure 2:
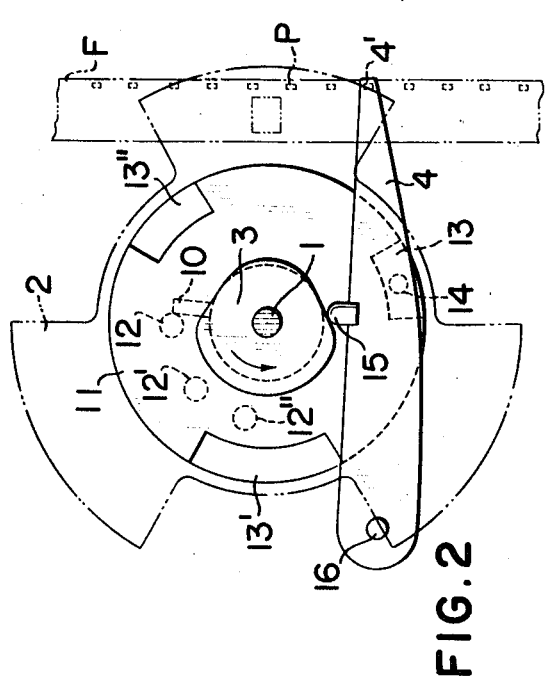
FIG. 2 is a front view of the device shown in FIG. 1.
Figure 1:
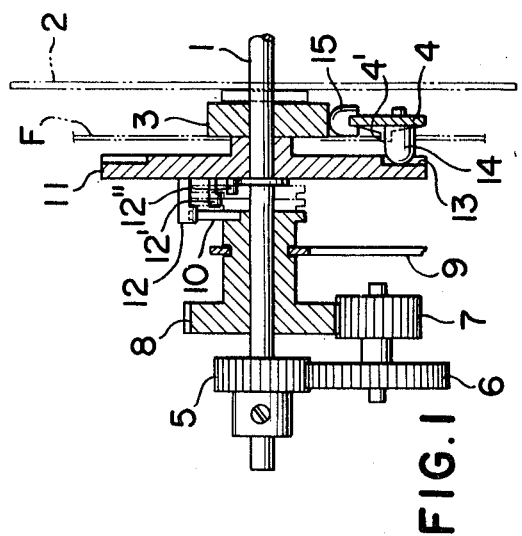
FIG. 1 is a cross-sectional view of a preferred embodiment of the film feeding device for motion-picture projectors according to the present invention.

Referring to FIGS. 1 and 2, a film feeding device for motion-picture projectors shown includes a main shaft 1 to be driven by suitable means, such as an electric motor (not shown), and a sector member of common structure is mounted on said main shaft 1 as indicated by the chain line 2. Further, a film feed cam 3 is fixedly mounted on the main shaft 1 rearwardly of the sector member 2. Below the main shaft 1 is provided a claw member 4 at a location corresponding to the cam 3, which extends transversely of the main shaft 1, with one end thereof pivotally connected to the frame (not shown) of a projector by means of a pivot pin 16 and the other end extending to as far as the path of a film F and provided with a claw 4' adapted to engage the perforation P of said film F. The claw member 4 is provided with a cam follower 15 at the middle of the top edge thereof and biased by suitable means, such as a spring (not shown), so that said cam follower 15 may be held in contact with the cam 3. Thus, it will be seen that the claw member 4 makes one reciprocatory movement on every rotation of the cam 3 and feeds the film F one frame when the claw 4' is in engagement with the perforation P of said film. Means for bringing the claw 4' of the claw member 4 into engagement with the film perforation p includes a disc cam 11 which is rotatably mounted on the main shaft 1 rearwardly of the film feeding cam 3. The disc cam 11 has three arcuate cam grooves 13, 13' and 13" formed in the periphery of the front face thereof is circumferentially spaced relation to each other, whereas the claw member 4 has a cam follower 14 provided on one side face thereof for engagement with said disc cam 11. The claw member 4 is biased toward the disc cam 11 by elastic means not shown, whereby the cam follower 14 is always held in engagement with the cam 11. Thus, it will be seen that when the cam follower 14 is received in any one of the grooves 13, 13' and 13" in the cam 11, the claw 4' of the claw member 4 is moved towards the film F and engages the film perforation P. Such being the arrangement, when the claw member 4 is rocked by the cam 3, with the cam follower 14 being received in any one of the cam grooves 13, 13' and 13", the film F is fed one frame by the claw 4'.

Means for operating the cam 11 by the main shaft 1 includes a gear 5 fixedly mounted on the rear end of said main shaft 1. The gear 5 is operatively connected with an idle gear 8 through intermediate gears 6 and 7 fixedly mounted on an intermediate shaft. The idle gear 8 is rotatably and axially slidably mounted on the main shaft 1 and provided with a lever 9 to cause axial sliding movement of said gear 8. The gear 8 is also provided with a pin 10 extending radially from the front end portion thereof, whereas the cam 11 is provided on the rear face thereof with pins 12, 12' and 12" for engagement with said pin 10, said pins 12, 12' and 12" being circumferentially spaced from each other and arranged on the same circle as shown in FIG. 2. As will be seen from FIG. 1, the lengths of the pins 12, 12' and 12" are made shorter in the order mentioned, so that by suitably selecting the axial position of the gear 8 on the main shaft 1 by means of the lever 9, the pin 10 is brought into engagement with the selected one of the pins 12, 12' and 12". Therefore, by engaging one of the pins 12, 12' and 12" with the pin 10, the cam 11 is driven, each time at a different phase with respect to the cam 3 and at a reduced speed relative to the rotational speed of said cam 3 (at a speed one-third of the rotational speed of the cam 3 in the embodiment illustrated), in the same direction as said cam 3.

Figure 3:
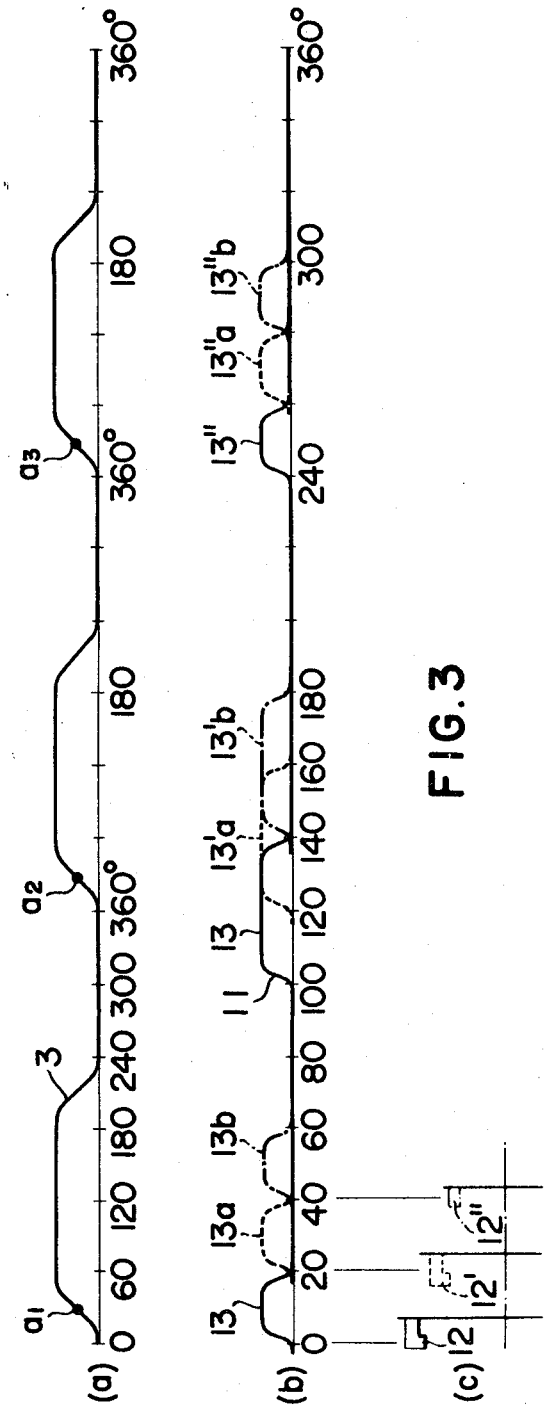
FIG. 3 is a diagram showing the operational phase relation between an operating cam for film feeding claw means and a claw engaging cam.

Now, the operation of the device constructed as described above will be explained with reference to FIG. 3. FIG. 3(a) illustrates the action of the cam 3 in its revolution for three complete turns, and film feeding motion is imparted to the claw member 4 at a rising portion of each curve, i.e. at the portions indicated by $a_1$, $a_2$ and $a_3$. FIG. 3(b) illustrates the actions of the cam grooves 13, 13' and 13" in one complete turn of the cam 11, in which the solid lines represent the case when the pin 10 is in engagement with the pin 12, the broken lines the case when the pine 10 is in engagement with the pin 12' and the chain lines the case when the pin 10 is in engagement with the pin 12", and the claw 4' of the claw member 4 is brought into engagement with the film perforation P at the crest portion of each curve. Under the conditions represented by the solid lines in FIG.3(b) that is, the condition in which the pin 10 is in engagement with the pin 12, the actions of the cam grooves 13, 13' and 13", and the action of the cam 3 are overlapped each other, so that the film F is fed one frame on every rotation of the cam 3. Then, the lever 9 is operated to engage the pin 10 with the pin 12', whereupon the actions of the cam grooves 13 and 13", and the action of the cam 3 are no longer overlapped each other and the action of the cam groove 13' only overlaps the action of the cam 3 since the cam groove 13' has a longer length than the other cam grooves. Under such condition, therefore, the film F is fed one frame on every 3 revolutions of the cam 3. Further, when the pin 10 is in engagement with the pin 12'', none of the actions of the cam grooves 13, 13' and 13'' overlaps the action of the cam 3 and, therefore, the film F is not fed and a still picture is projected on the screen.

Although in the embodiment described and illustrated herein reference is made to a film feeding device which is capable of feeding a film at normal speed or at a speed one-third of the normal speed, or of stopping the film, the film can be fed at an optional speed reduction ratio by suitably selecting the number of cam grooves formed in the disc cam and making one of said cam grooves longer than the other ones.

Further, although the present invention has been described and illustrated herein by way of a preferred embodiment thereof, it should be understood that the present invention is not restricted to the embodiment but many changes and modifications are possible without deviating from the scope of the invention.

I claim:

1. A film feeding device in a motion-picture projector, comprising; claw means having a claw adapted for engagement with the perforations of a film; first cam means for imparting a film feeding motion to said claw means; second cam means including a disc cam adapted to operationally engage said claw means and having a plurality of peripherally spaced cam grooves formed therein, at least one of said cam grooves in said disc cam being longer than the others, said second cam means adapted to bring the claw of said claw means into or out of engagement with the film perforations; a power-driven main shaft for rotating said first cam means at a predetermined rate, said first cam means being rigidly mounted on said shaft; means for positioning said second cam means in a selected phase relation with respect to said first cam means and rotating said second cam means in said selected phase relation at a selected speed reduction, said cam positioning and rotating means comprising a first gear rotatably and axially slidably mounted on said shaft and a second gear rigidly mounted on said shaft and operatively connected to said first gear to drive the latter at a predetermined speed reduction ratio, a radially projecting pin on said first gear; and a plurality of axially projecting pins on said disc cam, said axially projecting pins having different lengths whereby the phase relation between said first and second cams is selected, said second cam means being of such shape that the frequency of the film feeding motion of said claw means overlapping the engagement of said claw with the film perforations can be varied in accordance with the phase relation of the said second cam means to said first cam means, and said disc cam is driven relative to said first cam means at a speed ratio in inverse proportion to the number of said cam grooves.

2. A film feeding device as defined in claim 5, wherein said disc cam has three cam grooves formed therein, one of which is longer than the other two, and is driven at a speed one third of the speed of said first cam, and the phase relation between said first cam and said disc cam can be selected so that the film may be fed at normal speed or at a speed one third of said normal speed, or may be stopped.